United States Patent
Ferreri et al.

(10) Patent No.: US 10,516,809 B2
(45) Date of Patent: Dec. 24, 2019

(54) OPTIMIZING NUMBER OF GRID POINTS IN MULTI-DIMENSIONAL COLOR LOOKUP TABLE

(71) Applicant: Ricoh Company, Ltd., Tokyo (JP)

(72) Inventors: Vincent William Ferreri, Frederick, CO (US); Walter F. Kailey, Frederick, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/907,581

(22) Filed: Feb. 28, 2018

(65) Prior Publication Data

US 2019/0266455 A1   Aug. 29, 2019

(51) Int. Cl.
*H04N 1/04* (2006.01)
*H04N 1/60* (2006.01)
(Continued)

(52) U.S. Cl.
CPC ......... *H04N 1/6019* (2013.01); *G06F 17/175* (2013.01); *G06K 15/1802* (2013.01); *G06K 15/1878* (2013.01); *H04N 1/6008* (2013.01)

(58) Field of Classification Search
CPC .. G06K 15/1878; G06K 15/1802; H04N 1/60; H04N 1/6002; H04N 1/6008;
(Continued)

(56) References Cited

U.S. PATENT DOCUMENTS

| 6,160,644 A  * | 12/2000 | Lin | H04N 1/6058 358/518 |
| 6,181,445 B1 * | 1/2001 | Lin | H04N 1/6058 358/504 |

(Continued)

FOREIGN PATENT DOCUMENTS

| EP | 0706287 A2 | 4/1996 |
| JP | 2015115738 | 6/2015 |
| WO | 2016119858 A1 | 8/2016 |

OTHER PUBLICATIONS

Chen, Y., Berns, R. S., & Taplin, L. A. (2004). Six color printer characterization using an optimized cellular Yule-Nielsen spectral Neugebauer model. Journal of Imaging Science and Technology, 48(6), pp. 519-528.

(Continued)

*Primary Examiner* — Scott A Rogers
(74) *Attorney, Agent, or Firm* — Jaffery Watson Mendonsa & Hamilton LLP (57) ABSTRACT

A printing system is disclosed. The printing system includes a color management unit including optimization logic to generate a multi-dimensional color management lookup table derived from an input color to output color mapping, wherein the multi-dimensional color management lookup table has a non-uniform spacing of grid points specifying a correspondence between each of a plurality of input color space dimensions and output color space dimensions, and a color engine to receive an input color in an input color space, perform a multi-dimensional interpolation via the multi-dimensional color management lookup table to map the input color to an output color in an output color space; and return the output color.

20 Claims, 8 Drawing Sheets

(51) Int. Cl.
*G06K 15/02* (2006.01)
*G06F 17/17* (2006.01)

(58) Field of Classification Search
CPC .. H04N 1/6016; H04N 1/6019; H04N 1/6022; H04N 1/6025; G06F 17/17; G06F 17/175
USPC ........................................................ 358/1.9
See application file for complete search history.

(56) References Cited

U.S. PATENT DOCUMENTS

| | | | | |
|---|---|---|---|---|
| 6,185,004 B1* | 2/2001 | Lin | ...................... | H04N 1/6033 358/1.9 |
| 6,204,939 B1* | 3/2001 | Lin | ...................... | H04N 1/6058 358/1.9 |
| 7,312,891 B2* | 12/2007 | Tsuchiya | ................. | G06K 15/02 345/601 |
| 7,800,780 B2 | 9/2010 | Borg | | |
| 7,940,434 B2* | 5/2011 | Inoue | ................... | H04N 1/6019 345/591 |
| 8,355,173 B2* | 1/2013 | Seto | ..................... | H04N 1/6033 358/1.9 |
| 9,407,793 B2 | 8/2016 | Yamada | | |
| 9,704,073 B2 | 7/2017 | Okumura | | |
| 2004/0263879 A1* | 12/2004 | Ito | ........................ | H04N 1/6016 358/1.9 |
| 2004/0263880 A1* | 12/2004 | Ito | ........................ | H04N 1/6058 358/1.9 |
| 2004/0263882 A1* | 12/2004 | Ito | ........................ | H04N 1/6058 358/1.9 |
| 2005/0094169 A1* | 5/2005 | Berns | .................. | H04N 1/6033 358/1.9 |
| 2005/0094871 A1* | 5/2005 | Berns | .................. | H04N 1/6033 382/162 |
| 2006/0176529 A1* | 8/2006 | Ito | ........................ | H04N 1/6033 358/518 |
| 2006/0193018 A1* | 8/2006 | Ito | ........................ | H04N 1/6033 358/518 |
| 2007/0291312 A1* | 12/2007 | Kaneko | ................ | H04N 1/6033 358/2.1 |
| 2010/0134550 A1 | 6/2010 | Ito et al. | | |
| 2011/0222080 A1* | 9/2011 | Monga | ................. | H04N 1/6025 358/1.9 |
| 2011/0299128 A1 | 12/2011 | Mestha et al. | | |
| 2017/0061926 A1 | 3/2017 | Bhattacharjee | | |
| 2017/0324885 A1 | 11/2017 | Ochiai et al. | | |

OTHER PUBLICATIONS

Extended European Search Report for EP Application No. 19158189. 1, dated Jun. 26, 2019, 10 pages.
J.Z Chan et al., "Sequential linear interpolation of multidiminsional functions", IEEE Transactions on Image Processing, Sep. 1, 1997, 1231-1245, XP055579527.

* cited by examiner

OPTIMIZING NUMBER OF GRID POINTS IN MULTI-DIMENSIONAL COLOR LOOKUP TABLE

FIELD OF THE INVENTION

The invention relates to the field of color management, and in particular, to mapping input colors via color management to true output colors.

BACKGROUND

Color management applications often implement high-dimensional Look Up Tables (LUTs) to perform a multi-dimensional interpolation of an input color to map the input color from an input color space to an output color in an output color space. LUTs typically include a large number of uniformly spaced nodes in each color dimension in the input color space, with each dimension having the same number of grid points, to achieve sufficient accuracy for all profiles, intents and options.

However, input color spaces most often have three or more dimensions, resulting in the lookup table consuming a relatively large magnitude of computing resources. For instance, 4 MB may be required per device lookup table for CMYK to CMYK, with only 33 points in each of the color dimensions, and these 33 nodes in each dimension may still not provide an adequate sampling of the space to insure the required color accuracy. Similarly, 150 kB may be required per device lookup table for RGB to CMYK. Thus, lookup table size limits how rapidly a device (e.g., a printer) can switch color options (e.g., input profiles, output profiles, rendering intent, etc.) while processing, since large lookup tables must either be generated on the fly or read into memory from mass storage.

In cases where specialized color operation is required (e.g., Force-Black or Preserve-Black) the overall color space and LUT may become bifurcated. This transition for one locally smooth sub-space (e.g., the modified region) to another sub-space (e.g., the standard region) does not generally lie along a particular axis of the space and thus a higher degree of sampling (finer grid) is required to adequately resolve the transient. While this high sampling of the space is required to cleanly resolve the transition region, it generally over samples the two (relatively smooth) sub spaces as well. This becomes increasingly burdensome on the color management routines as LUT sizes can become increasingly large. For example, a Force-Black/Preserve-Black for a CMYK to CMYK LUT may require upwards of 57 nodes per dimension (and even this is not accurate in all cases) which can lead to LUTs over 40 MB in size.

Accordingly, a mechanism to optimize a color lookup table is desired.

SUMMARY

In one embodiment, a method is disclosed including generating a multi-dimensional color management lookup table derived from an input color to output color mapping, wherein the multi-dimensional color management lookup table has a non-uniform spacing of grid points specifying a correspondence between each of a plurality of input color space dimensions and output color space dimensions, receiving an input color in an input color space, performing a multi-dimensional interpolation via the multi-dimensional color management lookup table to map the input color to an output color in an output color space and return the output color.

BRIEF DESCRIPTION OF THE DRAWINGS

A better understanding of the present invention can be obtained from the following detailed description in conjunction with the following drawings, in which.

DETAILED DESCRIPTION

A mechanism to optimize a color lookup table is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "unit" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
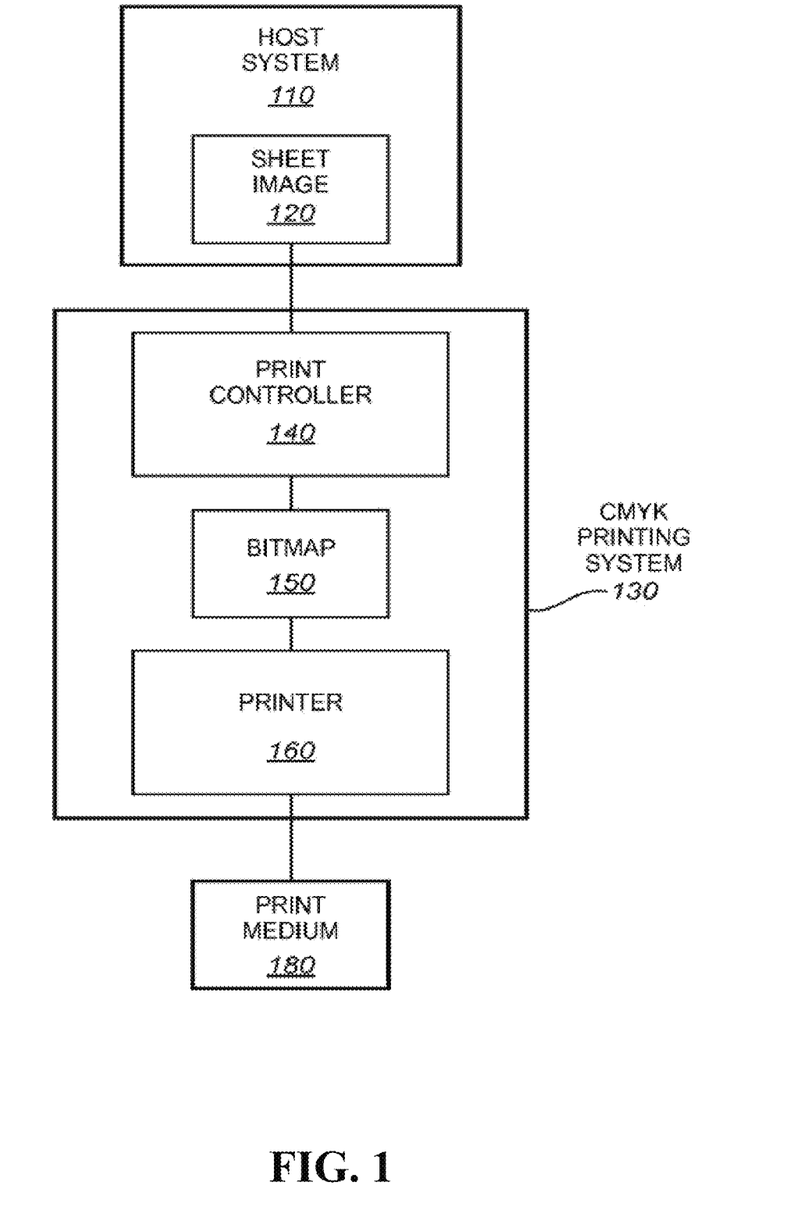
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 that is to be transmitted for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. In other embodiments, print controller 140 and printer 160 may be implemented in the same device or separate devices with coupling.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
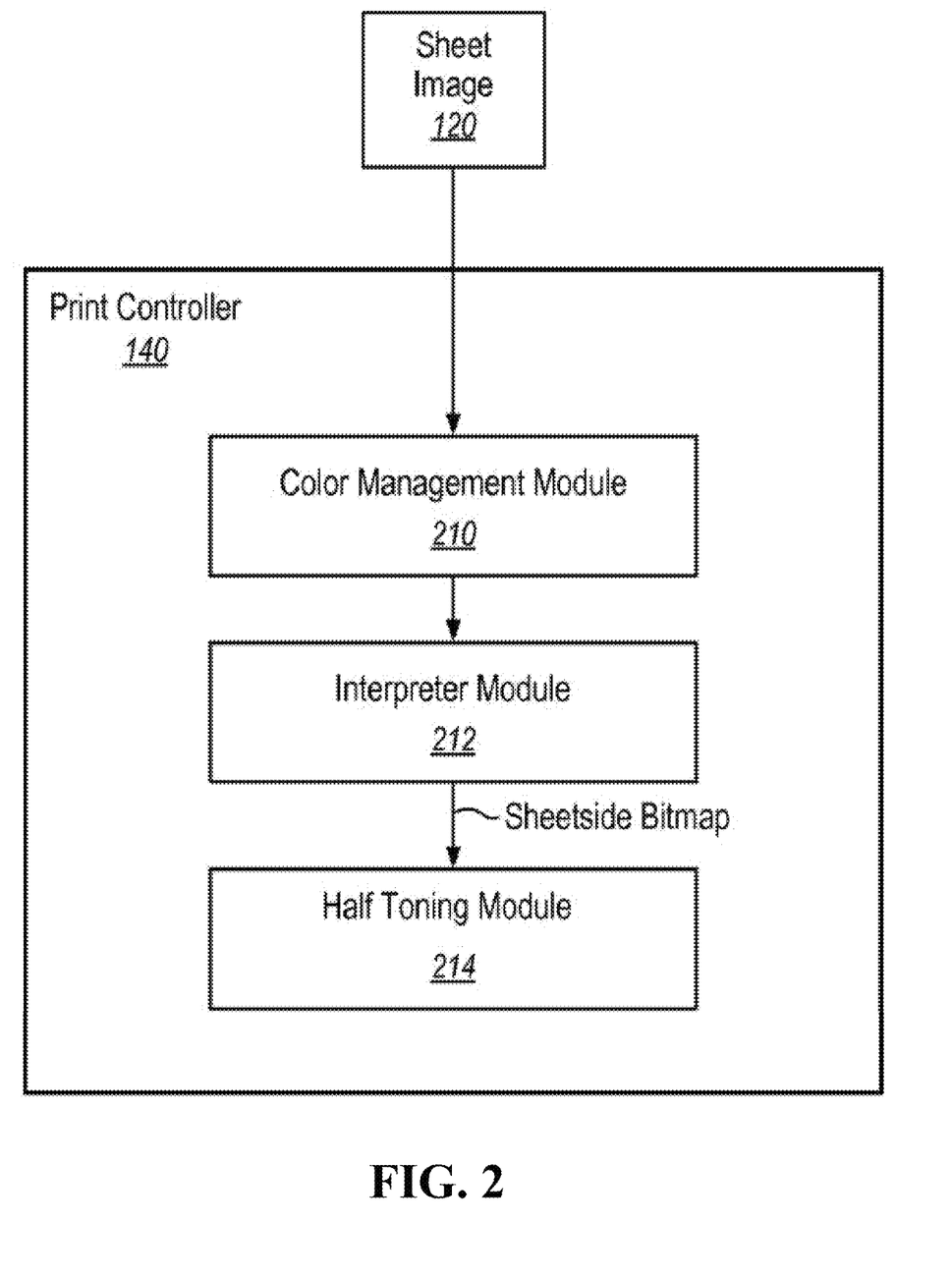
FIG. 2 is a block diagram of one embodiment of a print controller.

FIG. 2 is a block diagram illustrating one embodiment of a print controller 140. The print controller 140 (e.g., DFE or digital front end), in its generalized form, includes color management module 210, interpreter module 212 and halftoning module 214. Color management module 210 provides a color mapping from an input color space to a printer 160 color space.

Interpreter module 212 is operable to interpret, render, rasterize, or otherwise convert images (e.g., raw sheetside images or printer language data such as sheet image 120) of a print job into sheetside bitmaps. The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the entire set of pixels for the image. Interpreter module 212 is operable to interpret or render multiple raw sheetsides concurrently so that the rate of rendering substantially matches the rate of imaging of production print engines. Halftoning module 214 is operable to represent the sheetside bitmaps as halftone patterns of ink. For example, halftoning module 214 may convert the pixels to halftone patterns of CMYK ink for application to the paper.

Figure 3:
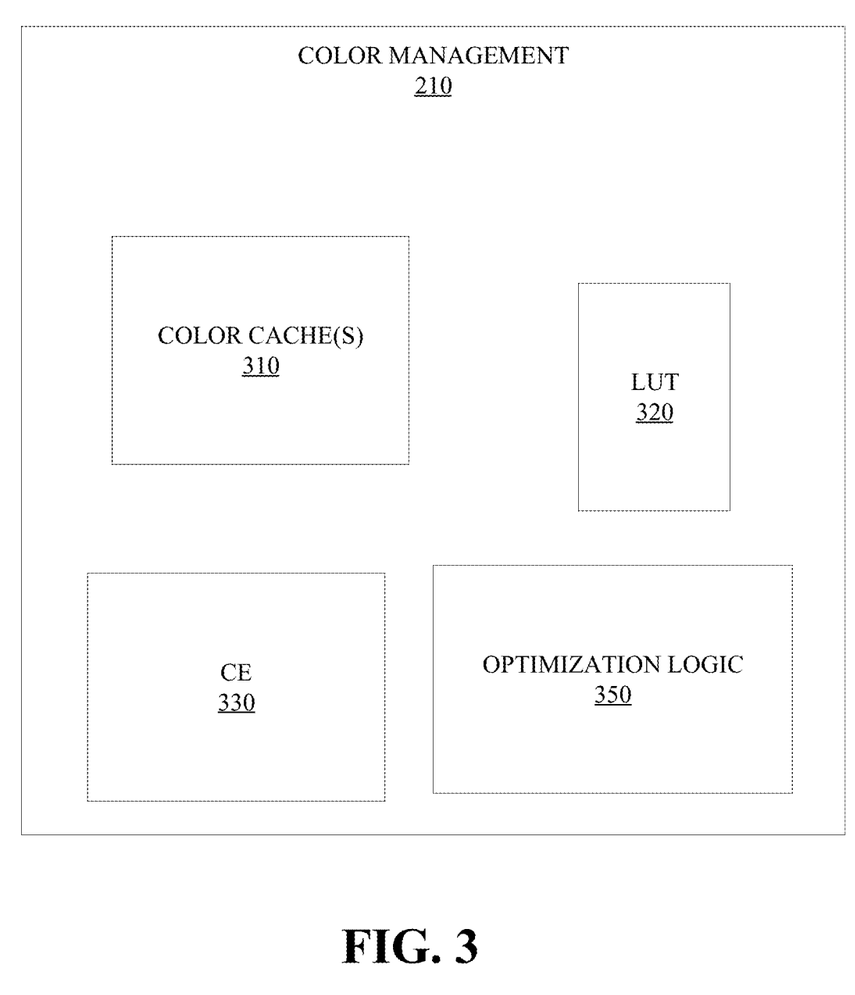
FIG. 3 illustrates one embodiment of a color management unit.

In one embodiment, color management unit 210 performs a color managed workflow by mapping to determine CMYK values for each pixel in a particular object to be printed at printer 160. FIG. 3 is a block diagram illustrating one embodiment of a color management unit 210. Color management unit 210 includes one or more color caches 310, and a color lookup tables (LUT) 320. Color cache(s) 310 may be hardware and/or software components that store color mapping data so that future requests for that data can be served faster. In one embodiment, color management unit 210 includes a color engine (CE) 330 to perform a color management operation upon receiving an input color.

Figure 4:
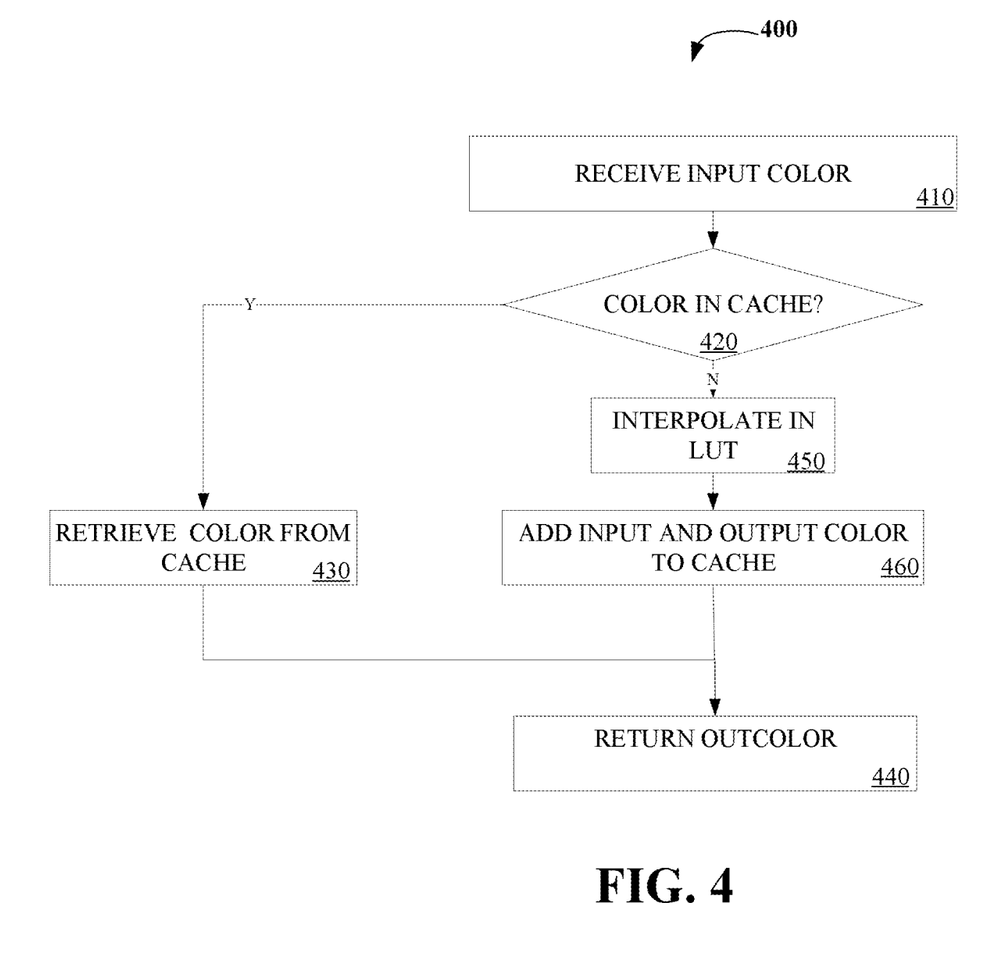
FIG. 4 is a flow diagram illustrating one embodiment of a color management process.

FIG. 4 is a flow diagram illustrating one embodiment of a color management process 400 performed by CE 330. At processing block 410, an input color is received at color management unit 210. At decision block 420, a determination is made as to whether the input color is in color cache 310. If so, an output color corresponding to the input color is retrieved from color cache 310, processing block 430. At processing block 440, the output color is returned. If at decision block 420, a determination is made that the input color is not in cache 310, a multi-dimensional interpolation is performed at LUT 320, processing block 450, to convert the input color from an input color space to an output color in an output color space. At processing block 460, the input color and the output color are stored in cache 310. At processing block 440, the output color is returned.

As discussed above, performing multi-dimensional interpolation within a single high-dimensional LUT requires a large number of nodes in each input color space dimension to achieve sufficient accuracy for all profiles, intents and options. Such LUT configurations typically designate an equal number of uniformly spaced nodes in each input color space dimension, which results in an inefficiency since some color dimensions may require significantly less nodes than others. Accordingly, it is currently necessary to maintain a large lookup table to accurately perform the multi-dimensional interpolations.

Referring back to FIG. 3, color management module 220 includes optimization logic 350 that is implemented to optimize a multi-dimensional color management lookup table (e.g., LUT 320) derived from an input color to output color mapping. In one embodiment, optimization logic 350 generates LUT 320 in a configuration having a non-uniform spacing of grid points that specify a correspondence between each of a plurality of input color space dimensions and output color space dimensions.

Figure 5:
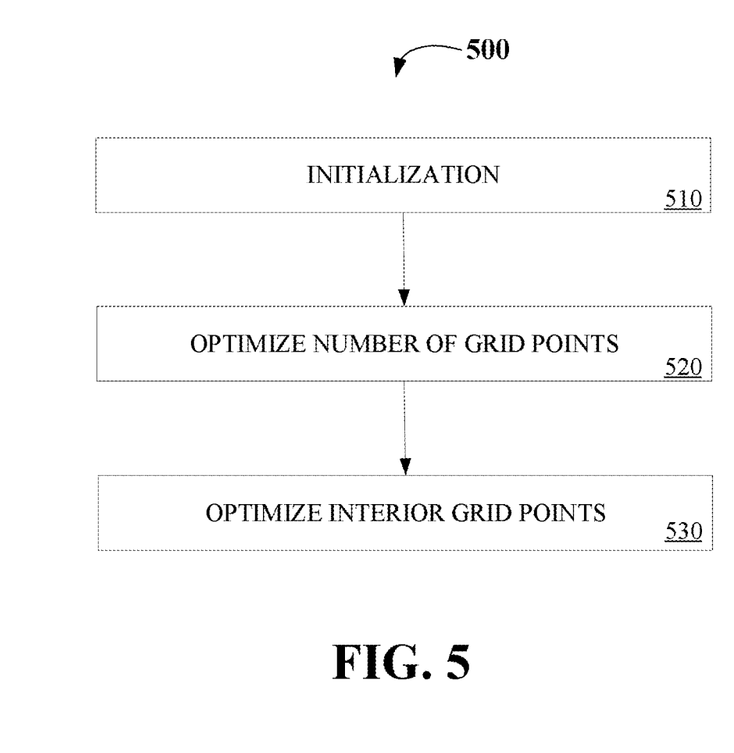
FIG. 5 is a flow diagram illustrating one embodiment of a process for generating a multi-dimensional lookup table.

FIG. 5 is a flow diagram illustrating one embodiment of a process 500 for generating a multi-dimensional lookup table with optimized grid points. Process 500 may be performed by processing logic that may comprise hardware (e.g., circuitry, dedicated logic, programmable logic, etc.), software (such as instructions run on a processing device), or a combination thereof. In one embodiment, process 500 may be performed by optimization logic 350. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 510, where the initialization for the optimization occurs. In one embodiment, the initialization may include determining output colors corresponding to at least some of the colors in the input color space. In such an embodiment, these determined output colors and corresponding input colors may be used as survey points representing the input color space to output color space conversion and be a basis for optimizing the multi-dimensional look up table grid points.

In a further embodiment, the grid point optimization initialization may include performing an interpolation process to determine an interpolated output color corresponding to each color in the input color space. This may involve a fine grid of colors that spans the input color space dimensions. Alternatively, the output color associated with each input color space point may be obtained by some other means, such as a formula or directly from color profiles.

In one embodiment, the fine grid is uniformly spaced in each input dimension and includes significantly more points in each dimension than the eventual optimized LUT; and may, but need not, include all the points in the input color space. In one embodiment, an n-dimensional linear interpolation is performed to determine the output color corresponding to each color in the fine grid. However other embodiments may implement other interpolation processes.

In a further embodiment, a lowest-order error term ($\delta y_j$) is determined for each of the interpolated output colors in each output color space dimension. In such an embodiment, the lowest-order error term includes an interpolated output color error corresponding to a closest distance grid point to a color in an input color space dimension. For n-dimensional linear interpolation, the interpolation computation reduces to a limited number of terms in a Taylor expansion centered at the closest grid point, and a lowest order missing term in that expansion is represented as:

$$\delta y_j^2 \approx \frac{1}{2}\sum_i \frac{\partial^2 y_j}{\partial x_i^2}\delta x_i^2,$$

where $y_j$ represents an output color found in the output color space dimension during the n-dimensional linear interpolation at the closest grid point to an input color $(x_i)$ in the input color space dimension. The lowest order-error term referred to above is defined as the term in an error expansion that has the slowest rate of increase of $\delta y_j$ as $\delta x_i$ increases. For a linear interpolation the lowest order error term is $\delta y_j$.

At processing block 520, a number of grid points is optimized in each input color space dimension. In one embodiment, the number of grid points is optimized by computing a cost function J(i) associated with each input dimension i and tabulating J(i) as a function of the number of grid points in dimension i. An overall cost function J is the sum over input dimensions i of J(i). Once the overall cost function is evaluated, the number of grid points in each dimension can be minimized, subject to a constraint, using known constrained optimization of functions methods.

In one embodiment, the constraint used is the maximum allowable value of the overall cost function J. However in another embodiment, the constraint used is the maximum allowable total number of grid points in the optimized LUT. The total number of grid points in the optimized LUT is the product of the number of grid points in each input dimension.

In one embodiment, the cost function J(i) for dimension i is defined as a sum over the input color space $\{x_k\}$ and over output dimensions j of the $\delta y_j^2$ term associated with input dimension i, such that:

$$J(i) \approx \frac{1}{2}\sum_{\{x_k\}}\left(\sum_j \frac{\partial^2 y_j(x_k)}{\partial x_i^2}\partial x_i^2\right),$$

However in other embodiments, the cost function for dimension i may be defined as a largest absolute value of any particular $\delta y_j^2$ term pertaining to input dimension i. At processing block 530, interior grid points are optimized for each input color space dimension. In one embodiment, the interior grid points are optimized by first forming a vector of interior grid points for each input color space dimension. In such an embodiment, the vector is formed by selecting the interior grid points. For example, selecting the grid points may include dropping the first (or lowest coordinate value, point 0) and last (e.g., the highest coordinate value) points in a list of all grid points of each dimension.

The end points are dropped because they are fixed, while the interior grid points are allowed to move since they are not fixed. Subsequently, a constrained minimization is performed on the interior points in each input color space dimension so that they are not allowed to move past (or equal) one other, and an optimum value vector of interior points of each grid dimension (e.g., optimum grid) is determined.

Once the vector of interior grid points is formed for each input color space dimensions, a cost function for the grid is computed (e.g., via one of the methods described earlier) and is associated to the vector of interior grid points. The cost function is then minimized (e.g., with gradient descent) by adjusting the location of the interior grid points. In one embodiment, a squared error sum over all input color space colors is determined based on a fine grid, of which the eventual optimal grid forms a subset.

In a further embodiment, the sum over fine grid points includes a central fine grid point between each pair of coarse grid points, and the sum of the cost function between two coarse grid points is approximated by the cost function at the central point, where the cost function often exhibits a strong maximum. Once the interior grid points have been optimized, non-uniform grid point spacing is achieved for each dimension in the lookup table.

In another embodiment, it is not necessary to fully optimize the cost function in each dimension, but instead each dimension of the input space may be traversed a single time, adding LUT nodes whenever an approximation to the local interpolation error based on the previous LUT node becomes excessive. Thus, each dimension is independently analyzed, and nodes are added when necessary.

In an embodiment using linear interpolation, for example, interpolation errors are approximately proportional to local curvature (e.g., the sum of the squares of the second partial derivatives of output colors with respect to input colors). In such an embodiment, within a particular dimension, at a particular point along that dimension, the local curvature may be inspected and the largest allowable local grid spacing is computed based on the local curvature and a largest allowable lowest order error term.

Further, a worst case curvature over all other input coordinate values, or the sum of curvature over all other input coordinates, or approximations to these based on a statistical sample, may be used to assess the local curvature at a particular value of a particular input coordinate. Given the local curvature assessment, a maximum grid point distance may be computed that gives rise to a maximum acceptable approximate interpolation error at this point in this particular input dimension.

Subsequently, a next LUT node is added at this maximum grid point distance from the previous node, and the analysis continues at that node. This continues until the maximum input coordinate is reached. At each added node, the distance to the next node is computed based on the worst case average curvature in that region and computing a grid point distance that limits the low order error term to an acceptable value at that point. While this will likely not produce the most optimal LUT, it will yield a LUT with bounded interpolation errors in a single pass. The resultant LUT will have limited interpolation errors and still be of manageable size.

Figure 6:
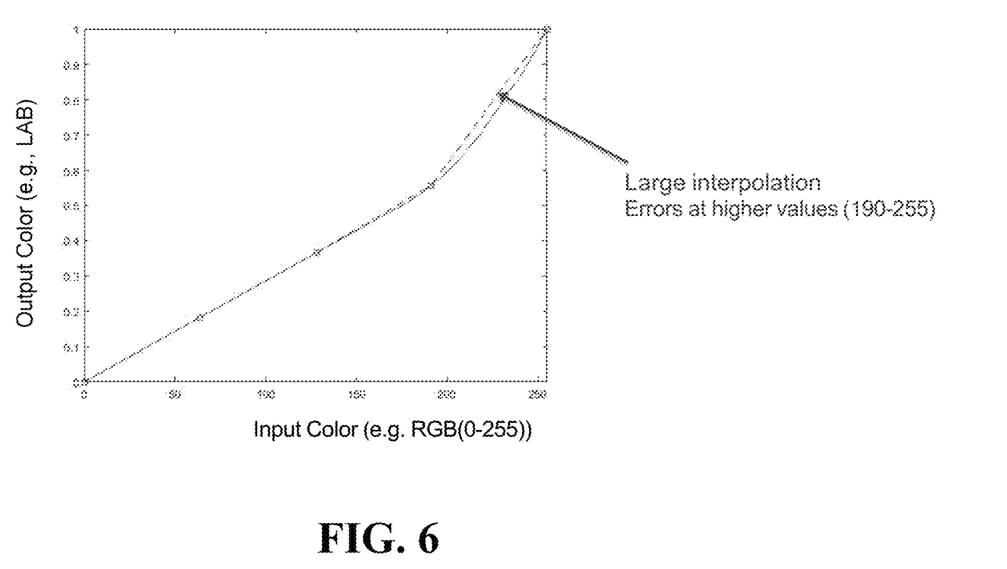
FIG. 6 is a graph illustrating a uniform sampling grid.
Figure 7:
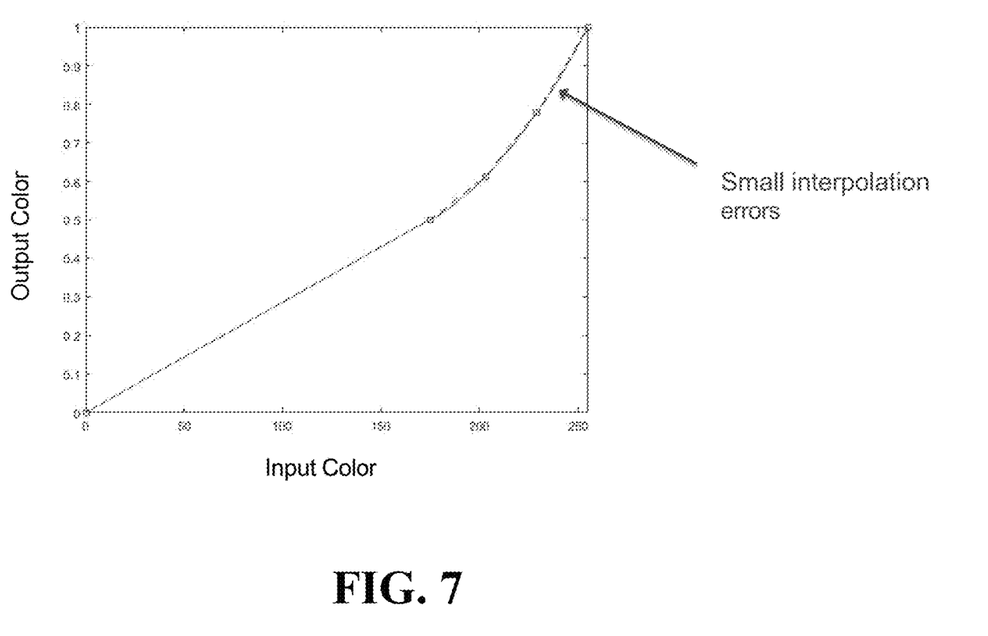
FIG. 7 is a graph illustrating one embodiment of an optimized sampling grid.

An optimized lookup table having a non-uniform grid spacing provides for smaller interpolation errors compared to a conventional lookup table employing uniform grid spacing. FIG. 6 is a graph illustrating a uniform sampling, while FIG. 7 is a graph illustrating one embodiment of an optimized non-uniform sampling grid. For illustration purposes, both grids include a one input and one output dimension for which a linear interpolation is performed. Other embodiments may have a plurality of input and output dimensions. Further, the grids include a curve for a linear interpolation function (solid line), as well as a curve for an actual (or desired) color mapping function (dotted line). As can be seen in FIG. 6, the uniform grid suffers from relatively large interpolation errors (e.g., difference between actual (or desired) output color and interpolated output color) at higher values (e.g., beginning at approximately grid point (190,0.5). However, FIG. 7 shows that there are much smaller interpolation errors for the same points in a non-uniform grid configuration.

Figure 8:
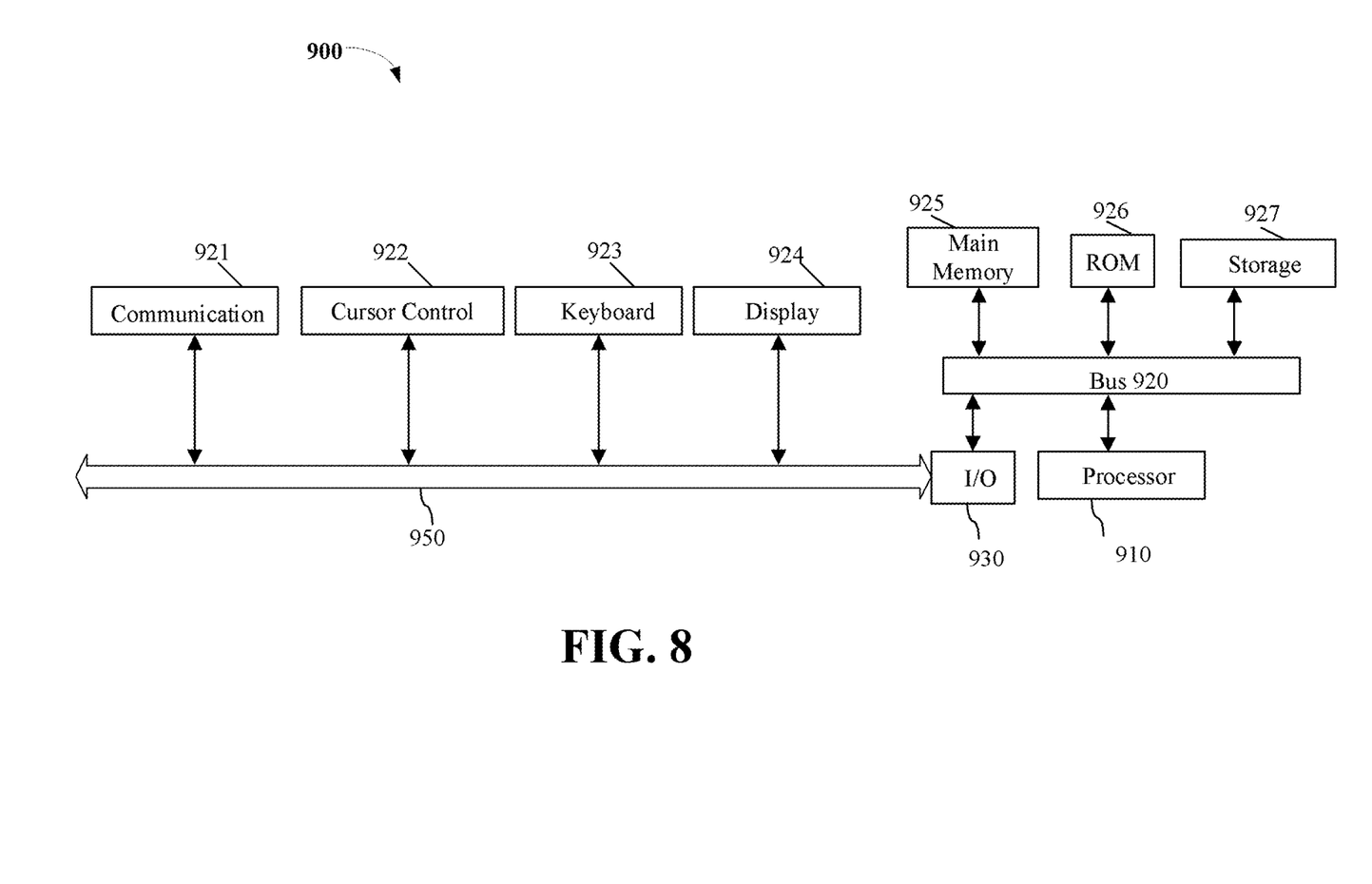
FIG. 8 illustrates one embodiment of a computer system.

FIG. 8 illustrates a computer system 900 on which printing system 130 and/or print controller 140 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., keyboard (or alphanumeric input device) 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. At least one non-transitory computer readable medium having instructions stored thereon, which when executed by one or more processors, cause the processors to:
generate a multi-dimensional color management lookup table derived from an input color to output color mapping by optimizing a number of the grid points in each of a plurality of the input color space dimensions, wherein the multi-dimensional color management lookup table has a non-uniform spacing of grid points optimized to minimize interpolation errors between the grid points;
receive an input color in an input color space;
perform a multi-dimensional interpolation via the multi-dimensional color management lookup table to map the input color to an output color in an output color space; and
return the output color.

2. The computer readable medium of claim 1, wherein generating the multi-dimensional color management lookup table further comprises:
initializing the optimizing of the grid points in each of the plurality of the input color space dimensions prior to optimizing the number of the grid points; and
optimizing interior grid points in each of the plurality of the input color space dimensions.

3. The computer readable medium of claim 2, wherein initializing the optimizing of the grid points comprises:
performing an interpolation process to determine an interpolated output color corresponding to each color in the input color space dimensions; and
determining for each of the interpolated output colors, a lowest-order error term in each of the plurality of the output color space dimensions.

4. The computer readable medium of claim 3, wherein the lowest-order error term comprises an interpolated output color error corresponding to a closest distance grid point to a color in the input color space dimension.

5. The computer readable medium of claim 4, wherein optimizing the number of the grid points in each of the plurality of the input color space dimensions comprises:
associating for each of the input color space dimensions, a cost function; and
assigning a number of the grid points between the input color space dimensions based on the cost function.

6. The computer readable medium of claim 5, wherein the number of grid points are assigned so that a sum of the cost function over each of the input color space dimensions is minimized subject to a constraint on a maximum number of the grid points.

7. The computer readable medium of claim 6, wherein the number of the grid points are assigned so that the number of the grid points is minimized subject to a constraint on a maximum sum of the cost function over each input color space dimension.

8. The computer readable medium of claim 5, wherein optimizing the interior grid points in each of the input color space dimension comprises:
forming a vector of interior grid points for each of the input color space dimensions; and
performing a minimization over all input color space colors and output color space dimensions for the vector of interior grid points.

9. The computer readable medium of claim 8, wherein forming the vector of grid points comprises:
selecting interior grid points;
performing the minimization on the selected interior grid points; and
determining an optimum value vector for the interior grid points.

10. The computer readable medium of claim 8, wherein the minimization is based on a squared error sum over all input color space colors is determined based on a fine grid comprising all possible optimal grid points but having many more points than the optimal grid.

11. A printing system comprising:
At least one memory device to store a color management unit, including:
optimization logic; and
a color engine; and
one or more processors, coupled to the at least one memory device, to execute the optimization logic to generate a multi-dimensional color management lookup table derived from an input color to output color mapping by optimizing a number of the grid points in each of the plurality of the input color space dimensions, wherein the multi-dimensional color management lookup table has a non-uniform spacing of grid points optimized to minimize interpolation errors between the grid points and specifying a correspondence between each of a plurality of input color space dimensions and output color space dimensions, and the color engine to receive an input color in an input color space, perform a multi-dimensional interpolation via the multi-dimensional color management lookup table to map the input color to an output color in an output color space; and return the output color.

12. The printing system of claim 11, wherein generating the multi-dimensional color management lookup table further comprises initializing the optimizing of the grid points in each of the plurality of the input color space dimensions prior to optimizing the number of the grid points, and optimizing the interior grid points in each of the plurality of the input color space dimensions.

13. The printing system of claim 12, wherein initializing the optimizing of the grid points comprises performing an interpolation process to determine an interpolated output color corresponding to each color in the input color space dimensions; and determining for each of the interpolated output colors, a lowest-order error term in each of the plurality of the output color space dimensions.

14. The printing system of claim 13, wherein the lowest-order error term comprises an interpolated output color error corresponding to a closest distance grid point to a color in the input color space dimension.

15. The printing system of claim 14, wherein optimizing the number of the grid points in each of the plurality of the input color space dimensions comprises associating for each of the input color space dimensions, a cost function and assigning a number of the grid points between the input color space dimensions based on the cost function.

16. The printing system of claim 15, wherein the number of grid points are assigned so that a sum of the cost function over each of the input color space dimensions is minimized subject to a constraint on a maximum number of the grid points.

17. The printing system of claim 16, wherein the number of the grid points are assigned so that the number of the grid points is minimized subject to a constraint on a maximum sum of the cost function over each input color space dimension.

18. The printing system of claim 15, wherein optimizing the interior grid points in each of the input color space dimension comprises forming a vector of interior grid points for each of the input color space dimensions and performing a minimization over all input color space colors and output color space dimensions for the vector of interior grid points.

19. The printing system of claim 18, wherein forming the vector of grid points comprises selecting interior grid points, performing the minimization on the selected interior grid points and determining an optimum value vector for the interior grid points.

20. The printing system of claim 18, wherein the minimization is based on a squared error sum over all input color space colors is determined based on a grid comprising all possible optimal grid points.

* * * * *